(12) United States Patent
Carrillo Fernandez

(10) Patent No.: US 11,465,576 B2
(45) Date of Patent: Oct. 11, 2022

(54) VEHICLE REAR BUMPER ASSEMBLY

(71) Applicant: Nissan North America, Inc., Franklin, TN (US)

(72) Inventor: Omar Fernando Carrillo Fernandez, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 164 days.

(21) Appl. No.: 17/087,257

(22) Filed: Nov. 2, 2020

(65) Prior Publication Data

US 2022/0134980 A1 May 5, 2022

(51) Int. Cl.
*B60R 19/02* (2006.01)
*B60R 19/18* (2006.01)
*B60R 19/04* (2006.01)

(52) U.S. Cl.
CPC ............ *B60R 19/023* (2013.01); *B60R 19/04* (2013.01); *B60R 19/18* (2013.01); *B60R 2019/1886* (2013.01)

(58) Field of Classification Search
CPC ....... B60R 19/023; B60R 19/18; B60R 19/04; B60R 2019/1886
See application file for complete search history.

(56) References Cited

U.S. PATENT DOCUMENTS

| | | | |
|---|---|---|---|
| 7,534,021 B2 * | 5/2009 | Naik | B60R 19/50 362/546 |
| 7,686,131 B1 * | 3/2010 | Osterkamp | F01N 13/001 181/227 |
| 8,157,278 B2 * | 4/2012 | Buck | B60R 3/00 280/166 |
| 2007/0182175 A1 | 8/2007 | Naik et al. | |
| 2007/0228745 A1 | 10/2007 | Cormier et al. | |
| 2009/0230589 A1 | 9/2009 | Rossi et al. | |
| 2010/0015387 A1 | 1/2010 | Rossi et al. | |

* cited by examiner

*Primary Examiner* — D Glenn Dayoan
*Assistant Examiner* — Melissa Ann Bonifazi
(74) *Attorney, Agent, or Firm* — Global IP Counselors, LLP

(57) ABSTRACT

A vehicle rear bumper assembly includes a vehicle body structure, an exhaust system and a rear bumper fascia. The exhaust system is attached to the vehicle body structure and has an exhaust pipe. The rear bumper fascia has a main body and a finisher extension. The main body is attached to the vehicle body structure and has a recessed area shaped and dimensioned to complement the shape of the exhaust pipe. The finisher extension extends away from the main body proximate the recessed area. The main body and the finisher extension are formed with a living hinge therebetween such that the finisher extension is pivotable about the living hinge from an extending orientation to a finishing orientation. In the extending orientation, the finisher extension is spaced apart from the recessed area. In the finishing orientation, the finisher extension is located within the recessed area adjacent to the exhaust pipe.

19 Claims, 12 Drawing Sheets

VEHICLE REAR BUMPER ASSEMBLY

BACKGROUND

Field of the Invention

The present invention generally relates to vehicle rear bumper assembly. More specifically, the present invention relates to rear bumper assembly that includes a finisher extension that pivots into a recessed area dimensioned to complement the appearance of an adjacent an exhaust pipe.

Background Information

Exhaust finisher structures are typically trim elements that are added to a bumper fascia requiring human operators to assembly such trim elements.

SUMMARY

It has been discovered that in order to reduce manufacturing costs and improve the appearance of a rear bumper fascia and an adjacent exhaust pipe, that a rear bumper fascia can be formed with a finisher extension that pivots about a living hinge to provide a finished look or appearance to the rear bumper fascia in a recessed area adjacent to an exhaust pipe.

In view of the state of the known technology, one aspect of the present disclosure is to provide a vehicle rear bumper assembly with a vehicle body structure, an exhaust system and a rear bumper fascia. The exhaust system is attached to the vehicle body structure and has an exhaust pipe. The rear bumper fascia has a main body and a finisher extension. The main body is attached to the vehicle body structure and has a recessed area shaped and dimensioned to complement the shape of the exhaust pipe. The finisher extension extends away from the main body proximate the recessed area. The main body and the finisher extension are formed with a living hinge therebetween such that the finisher extension is pivotable about the living hinge from an extending orientation to a finishing orientation. In the extending orientation, a distal end of the finisher extension is spaced apart from the recessed area. In the finishing orientation, the distal end of the finisher extension and the finisher extension are located within at least a portion of the recessed area and are positioned adjacent to the exhaust pipe.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
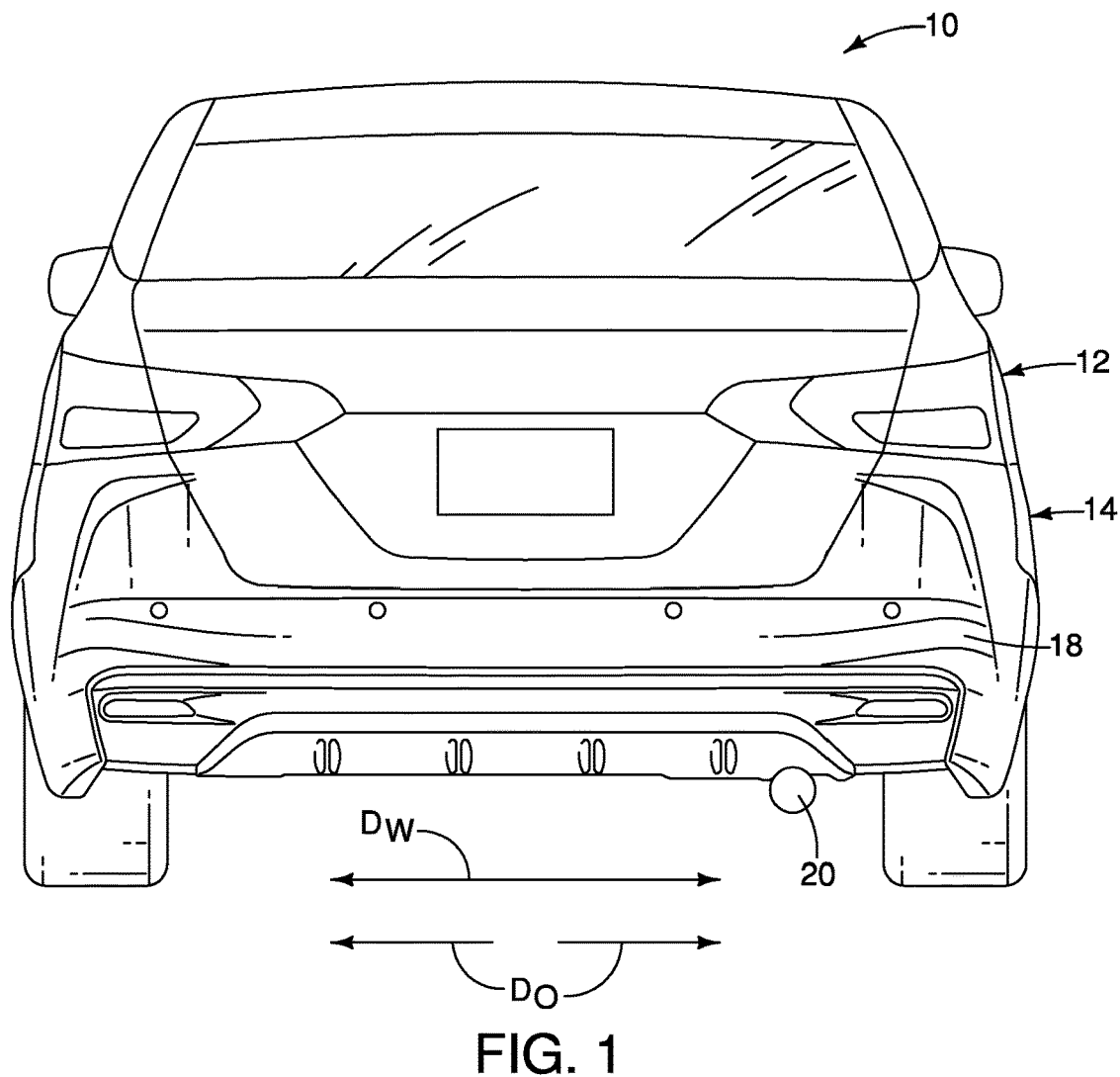
FIG. 1 is a rear view of a vehicle having a rear bumper assembly showing a rear bumper fascia that includes a finisher extension in accordance with a first embodiment.

Referring initially to FIG. 1, a vehicle 10 having a vehicle body structure 12 that includes a rear bumper assembly 14 is illustrated in accordance with a first embodiment.

In the depicted embodiment the vehicle is a sedan or coupe with two or four doors. Since coupe and sedan body designs are convention designs, further description is omitted for the sake of brevity.

The vehicle body structure 12 includes many structural elements. Since most elements of vehicle body structures are conventional and well known, further description thereof is omitted for the sake of brevity, except where such structures or features are necessary for understanding the rear bumper assembly 14 (also referred to as a vehicle rear bumper assembly 14).

Figure 3:
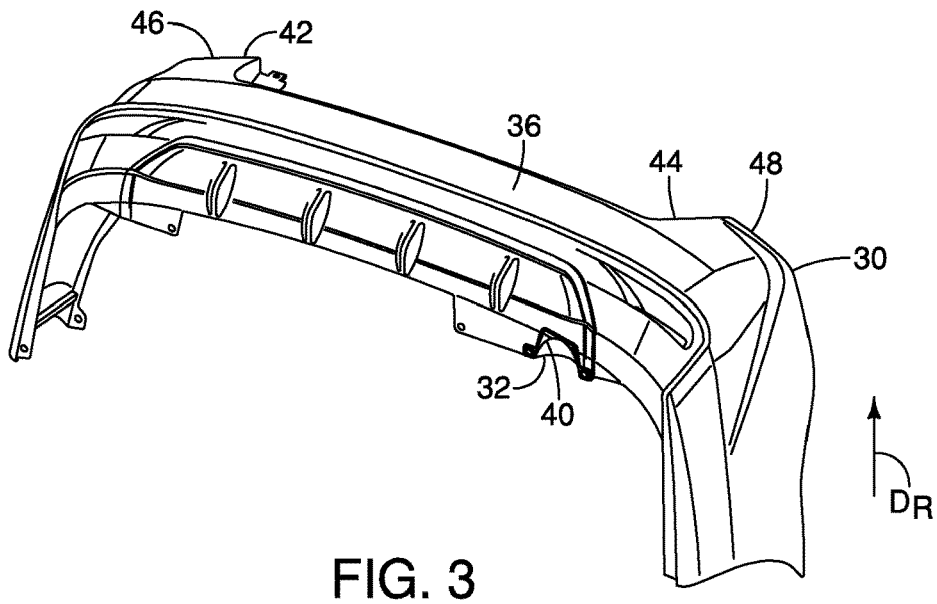
FIG. 3 is a perspective view of the rear bumper fascia showing the finisher extension pivoted about a living hinge from the extending orientation to a finishing orientation with the finisher extension moved into a recessed area or open area defined along a lower flange section of the rear bumper fascia in accordance with the first embodiment.
Figure 4:
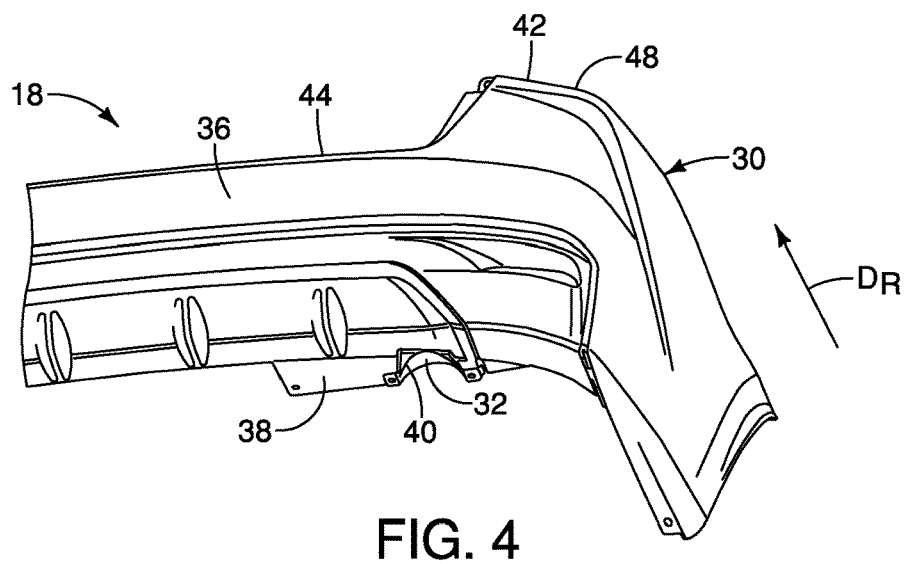
FIG. 4 is another perspective view of the rear bumper fascia showing the finisher extension pivoted about the living hinge to the finishing orientation with the finisher extension moved into the recessed area defined along the lower flange section of the rear bumper fascia in accordance with the first embodiment.
Figure 5:
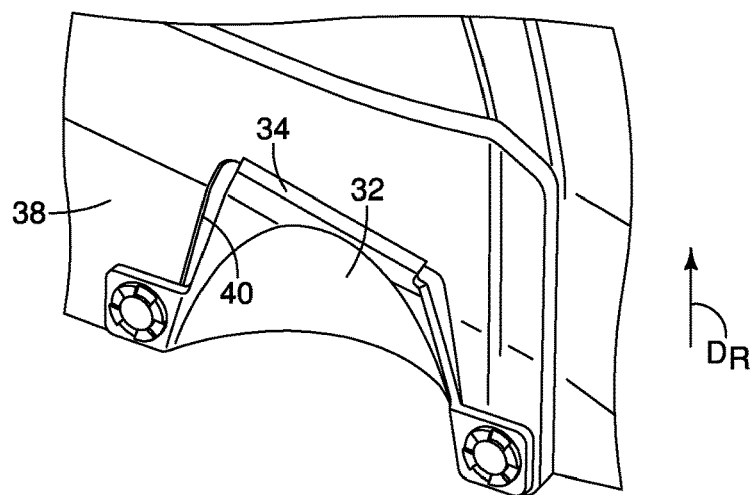
FIG. 5 is still another perspective view of a portion of the rear bumper fascia showing the finisher extension pivoted about the living hinge to the finishing orientation with attachment flange portions of the finisher extension fastened to corresponding portions of the lower flange section on opposite sides of the recessed area in accordance with the first embodiment.

The vehicle 10 and rear bumper assembly 14 define a widthwise direction $D_W$ and outboard directions $D_O$, as shown in FIG. 1 and rearward direction $D_R$, as shown in FIGS. 3-5. The widthwise direction $D_W$ corresponds to a lateral direction of the vehicle 10 that is perpendicular to a centerline (not shown) of the vehicle 10, where the centerline extends from the front of the vehicle 10 to the rear of the vehicle 10. The centerline (not shown) is also centered between the two lateral sides of the vehicle 10. The outboard directions $D_O$ are defined as directions from the centerline of the vehicle 10 that extend laterally outboard from the center of the vehicle perpendicular to the centerline of the vehicle 10. Since a centerline, widthwise direction, and outboard directions are conventional characteristics of a vehicle, further description is omitted for the sake of brevity.

The rear bumper assembly 14 includes a support beam (not shown) that is fixed to the vehicle body structure 12 in a conventional manner, an energy absorbing member (not shown) that is fixed to at least the support beam and a rear bumper fascia 18 that covers and conceals both the support beam and the energy absorbing member. The rear bumper fascia 18 is attached to at least fenders and structural portions (not shown) of the vehicle body structure 12. The rear bumper fascia 18 can also optionally be attached to the energy absorbing member (not shown) in a conventional manner. Since energy absorbing members and support beams of a bumper assembly are conventional vehicle features, further description of energy absorbing members and support beams is omitted for the sake of brevity. A description of the rear bumper fascia 18 is proved hereinbelow.

As shown in FIGS. 1 and 13-15, the vehicle 10 also includes an exhaust system 20 with an exhaust pipe 22 that extends rearward from the remainder of the exhaust system 20 below and adjacent to the rear bumper fascia 18, as described further below.

A description of the rear bumper fascia 18 is now provided with specific reference to FIGS. 1-12. The rear bumper fascia 18 (hereinafter referred to as the fascia 18) has main body 30, a finisher extension 32 and a living hinge 34 that connects the finisher extension 32 to the main body 30.

The main body 30 is attached to the vehicle body structure 12 in a conventional manner, as mentioned above, via mechanical fasteners or other attachment structures. The main body 30 has a rearward facing surface 36 and a lower flange section 38. The lower flange section 38 of the main body 30 extends in a vehicle forward direction (opposite the rearward direction $D_R$) from a lower area of the rearward facing surface 36.

Figure 7:
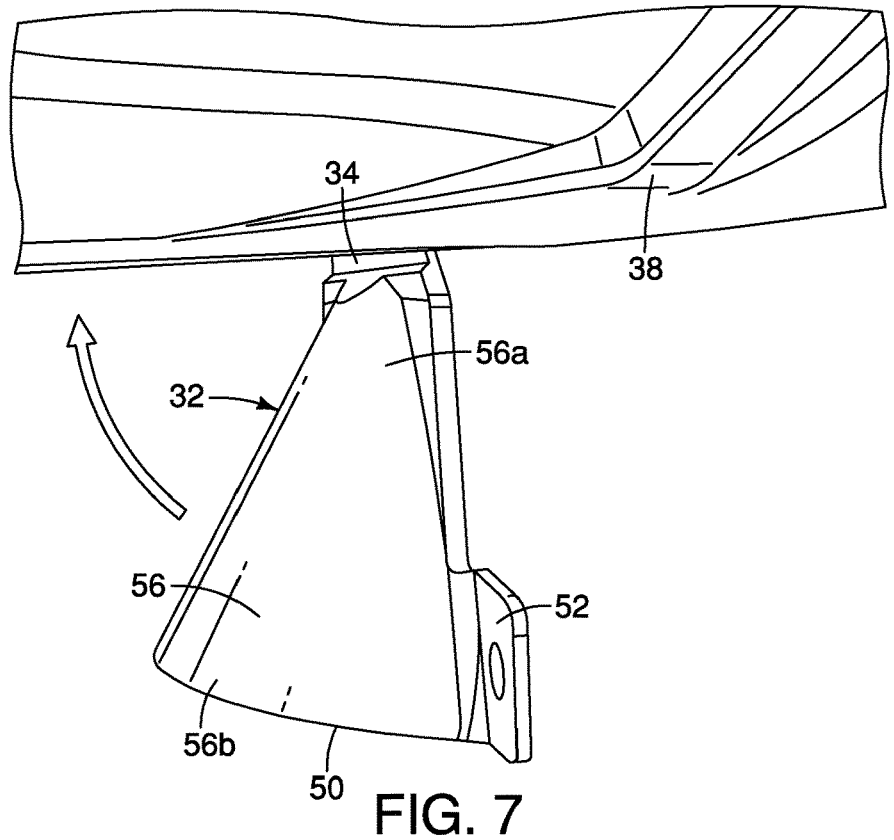
FIG. 7 is a side view of the rear bumper fascia showing the finisher extension in the extending orientation prior to movement to the finishing orientation in accordance with the first embodiment.
Figure 8:
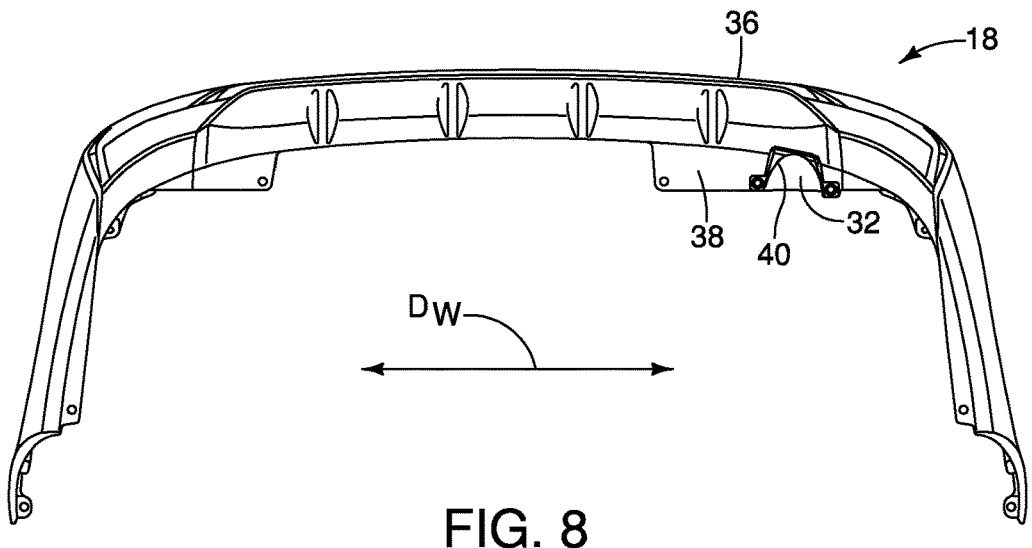
FIG. 8 is a bottom view (looking upward) of the rear bumper fascia showing the finisher extension pivoted about the living hinge to the finishing orientation in accordance with the first embodiment.
Figure 9:
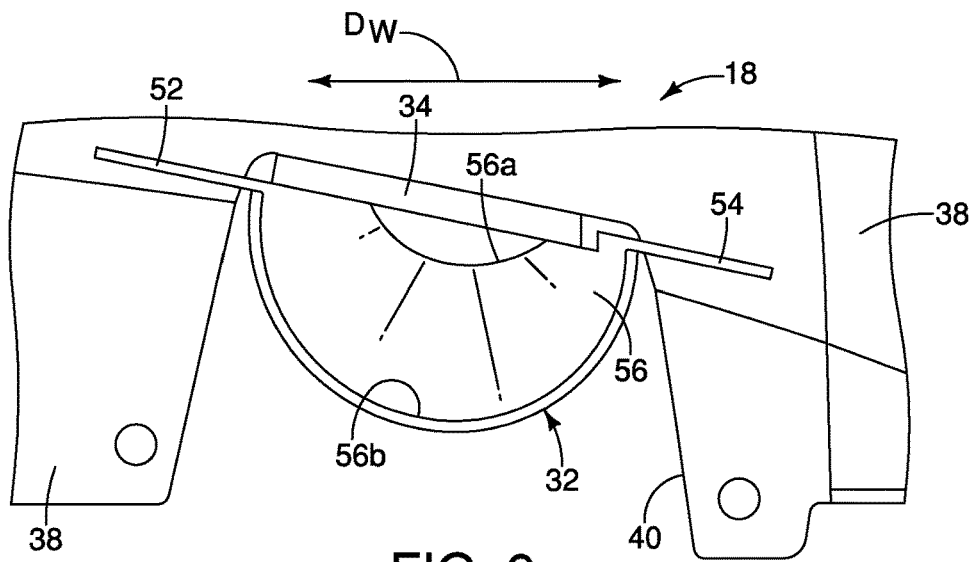
FIG. 9 is a bottom view (looking upward) of a portion of the rear bumper fascia showing the recessed area of the lower flange section of the rear bumper fascia with the finisher extension in the extending orientation in accordance with the first embodiment.
Figure 10:
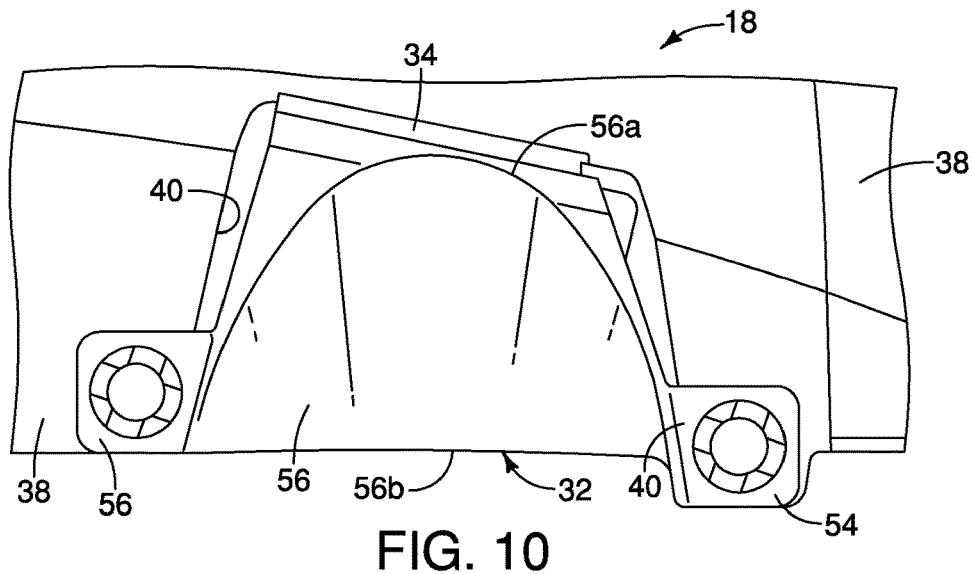
FIG. 10 is another bottom view of the portion of the rear bumper fascia depicted in FIG. 9 showing the recessed area of the lower flange section of the rear bumper fascia with the finisher extension moved to the finishing orientation and with attachment flange portions of the finisher extension 32 fastened to the lower flange section in accordance with the first embodiment.

As shown in FIGS. 1-10, the main body 30 and the lower flange section 38 are formed with a recessed area 40. As viewed from the rear of the fascia 18, the recessed area 40 is partially defined by the living hinge 34 visible along a portion of the lower edge of the rearward facing surface 36, as shown in FIGS. 1, 5-6 and 9-10. The remainder of the recessed area 40 is defined by opposing edges of the lower flange section 38. However, from underneath the vehicle 10 looking upward at the lower flange section 38 the recessed area 40 is an open area or gap bounded at a rearward end thereof by the living hinge 34, as shown in FIGS. 5 and 9-10. The recessed area 40 is dimensioned to receive the finisher extension 32 in order to accommodate and approximately correspond to the shape of the exhaust pipe 22 in a manner further described hereinbelow.

It should be understood from the drawings and description herein that the exhaust pipe 22 is positioned to extend below the recessed area 40 but preferably does not contact the finisher extension 32 or the fascia 18.

Figure 2:
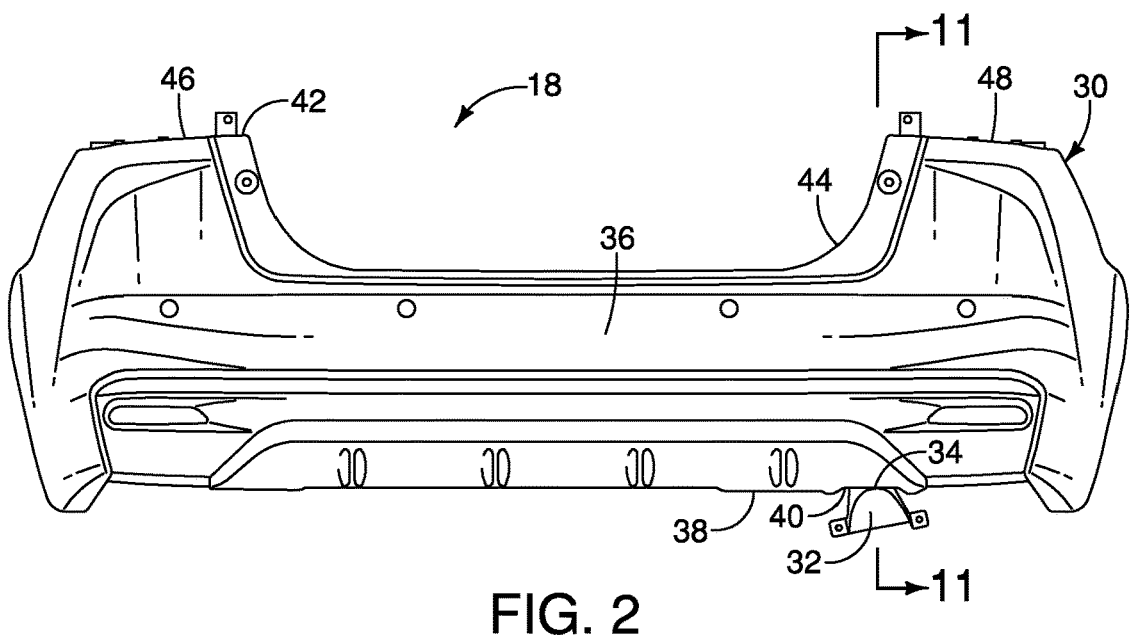
FIG. 2 is a rear view of the rear bumper fascia removed from the vehicle and the rear bumper assembly showing the finisher extension in an extending orientation after manufacturing thereof but prior to installation to the rear bumper assembly and the vehicle in accordance with the first embodiment.

As shown in FIGS. 2-4, the main body 30 of the fascia 18 also includes an upper edge 42 that defines a trunk opening recess 44 with fender aligning edges 46 and 48 at opposite sides thereof. In the depicted first embodiment, the recessed area 40, the living hinge 34 and the finisher extension 32 are located below a laterally outboard side of the trunk opening recess 44 but can alternatively be located below the fender aligning edges 46 or 48.

The main body 30, the living hinge 34 and the finisher extension 32 are formed as a single, unitary, monolithic element. Specifically, when manufactured, formed and/or molded, the main body 30, the living hinge 34 and the finisher extension 32 are made simultaneously as a single element of the same materials. For example, the fascia 18 can be made using various resin materials, such as, thermoplastic olefins (TPOs), polycarbonates, polyesters, polypropylene, polyurethanes and/or polyamides, and/or other materials with characteristics such as resiliency, flexibility and that resist deformation in response to low speed impact events.

A description of the finisher extension 32 is now provided with specific reference to FIGS. 2-10. When the fascia 18 is manufactured or formed, the main body 30 and the finisher extension 32 are formed with the living hinge 34 therebetween such that the finisher extension 32 in an extending orientation with a distal end 50 being spaced apart from the recessed area 40 (see FIGS. 2, 6-7 and 9). The finisher extension 32 is pivotable about the living hinge 34 from the extending orientation (FIGS. 2, 6-7 and 9) to a finishing orientation (FIGS. 1, 3-5, 8 and 10) with the distal end 50 of the finisher extension 34 being located within at least a portion of the recessed area 40.

In the extending orientation, the finisher extension 32 extends approximately perpendicular to the lower flange section 38 of the fascia 18, as shown in FIG. 7. In the finishing orientation, the finisher extension 32 extends approximately parallel to the lower flange section 38 within the recessed area 40, as shown in FIG. 5.

The finisher extension 32 is formed with an attachment flange that is defined by attachment flange portions 52 and 54 at the distal end 50 thereof. Between the attachment flange portions 52 and 54 and the living hinge 34, the finisher extension 32 includes a conically shaped portion 56 having a first end 56*a* and a second end 56*b*. The first end 56*a* of the conically shaped portion 56 is located proximate and adjacent to the living hinge 34. The second end 56*b* of the conically shaped portion 56 is located at the distal end 50 of the finisher extension 32. The first end 56*a* of the truncated conically shaped portion 56 is narrower than the second end 56*b* of the truncated conically shaped portion 56.

The conically shaped portion 56 of the finisher extension 32 is shaped and dimensioned to complement the shape of the exhaust pipe 22 with the finisher extension 32 in the finishing orientation, as shown in FIGS. 1, 3-5, 8 and 10. In the finishing orientation, the finisher extension 32 extend away from the rearward facing surface 36 of main body 30 and is located within the recessed area 40.

Figure 6:
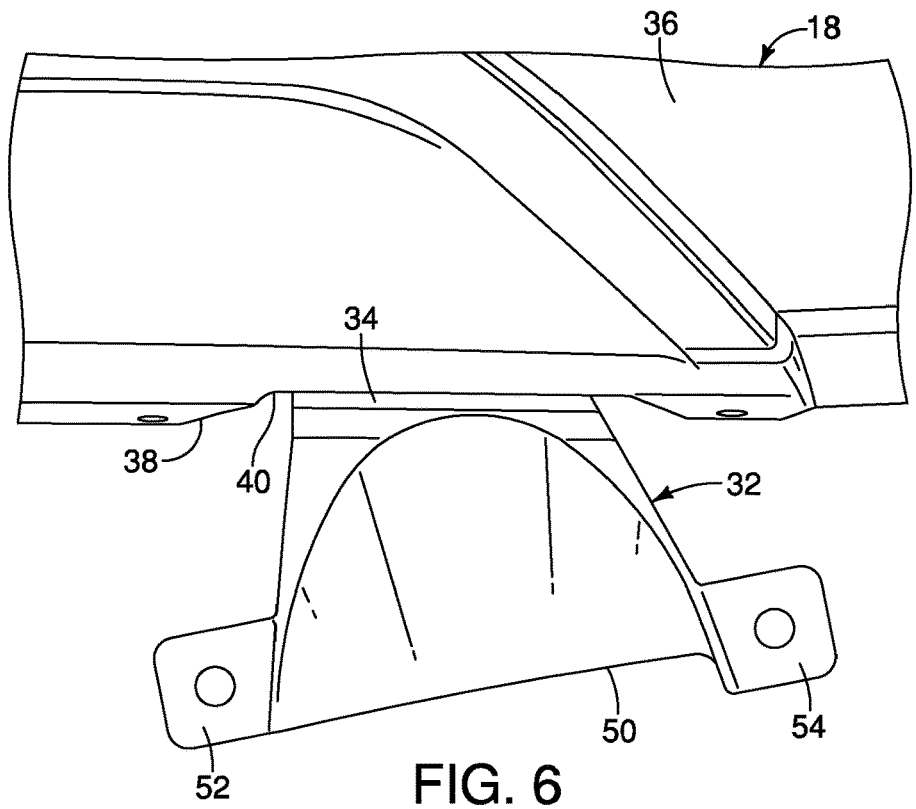
FIG. 6 is a rear view of the rear bumper fascia showing the finisher extension in the extending orientation prior to movement to the finishing orientation in accordance with the first embodiment.

As shown in FIGS. 6 and 9, the attachment flange portions 52 and 54 are not aligned with one another relative to the widthwise direction $D_W$ of the vehicle 10 and the fascia 18. Specifically, the attachment flange portion 54 extends in a forward direction of the vehicle 10 more than the attachment flange portion 52 as shown in FIGS. 8-10. The attachment flange portions 52 and 54 (the attachment flange) attach to the lower flange section 38 at opposite sides of the recessed area 40 with the finisher projection 32 in the finishing orientation, as shown in FIGS. 3-5 and 10.

Figure 11:
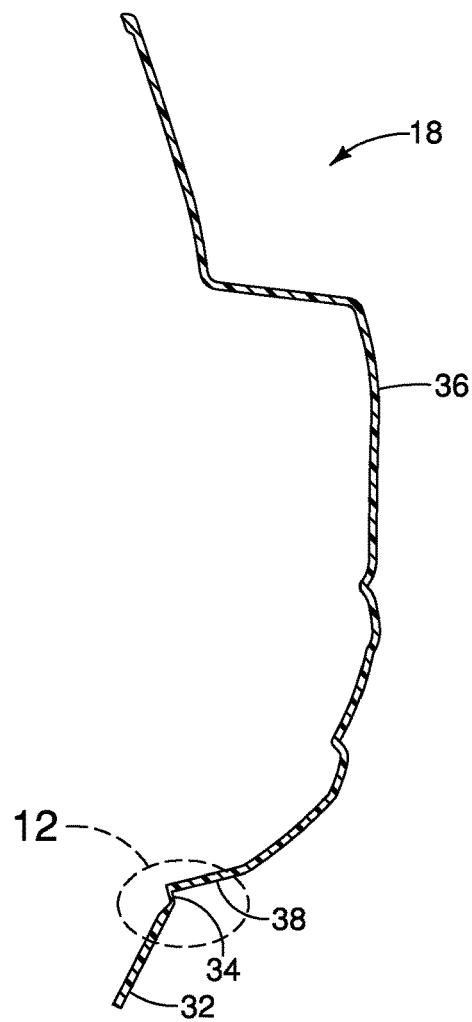
FIG. 11 is a cross-section of the rear bumper fascia taken along the line 11-11 in FIG. 2 showing the main body, the lower flange section, the living hinge and the finisher extension with the finisher extension in the extending orientation in accordance with the first embodiment.
Figure 12:
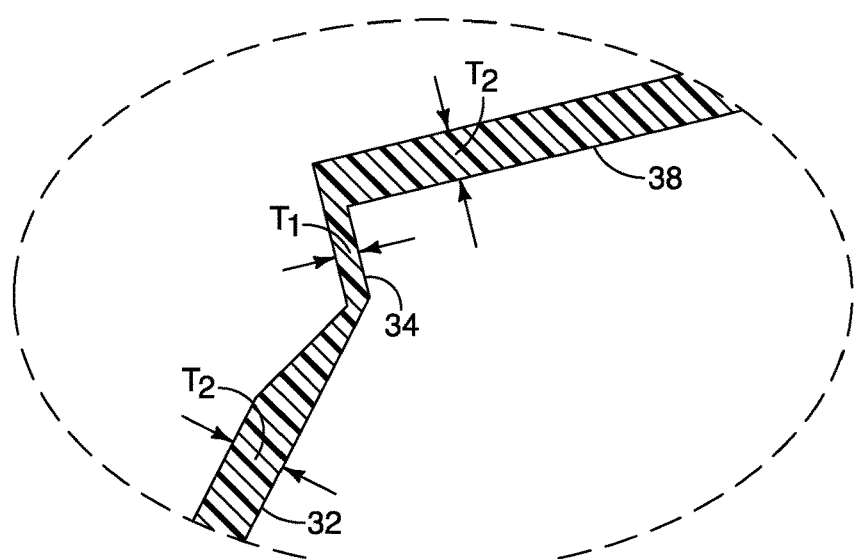
FIG. 12 is another cross-section of a portion the rear bumper fascia depicted in FIG. 11, showing the relative thicknesses of the lower flange section, the living hinge and the finisher extension with the finisher extension in the extending orientation in accordance with the first embodiment.

The living hinge 34 provides a connection between the finisher extension 32 to the main body 30 of the fascia 18. As mentioned above, the main body 30, the finisher extension 32 and the living hinge 34 are all formed unitarily as a single monolithic element. However, as shown in FIGS. 11 and 12, the living hinge 34 has a first thickness $T_1$ and the adjacent area of the lower flange section 38 of the main body 30 and the finisher extension 32 have a second thickness $T_2$. The thickness $T_2$ is greater than the thickness $T_1$ and can be more than twice the size of the thickness $T_1$.

As shown in FIGS. 8-10, the living hinge 34 extends in a direction that is not parallel to the widthwise direction $D_W$ (lateral direction) of the vehicle 10 and the fascia 18. In the depicted first embodiment, the living hinge 34 is approximately 10 degrees offset from the widthwise direction $D_W$.

As mentioned above, the finisher extension 32 is pivotable about the living hinge 34 from the extending orientation (FIGS. 2, 6-7 and 9) to a finishing orientation (FIGS. 1, 3-5, 8 and 10). During the manufacturing or forming process used to produce the fascia 18, the finisher extension 32 is manufactured in the extending orientation shown in FIGS. 2, 6-7 and 9. In order to produce a more finished appearance, the finisher extension 32 is bent or pivoted about the living hinge 34 in a vehicle forward direction such that the conically shaped portion 56 is located between and slightly above the lower flange section 38 within the recessed area 40 to the finishing orientation shown in FIGS. 1, 3-5, 8 and 10. Thereafter, the attachment flange portions 52 and 54 are attached via fasteners to their respective adjacent portions of the lower flange section 38.

Figure 13:
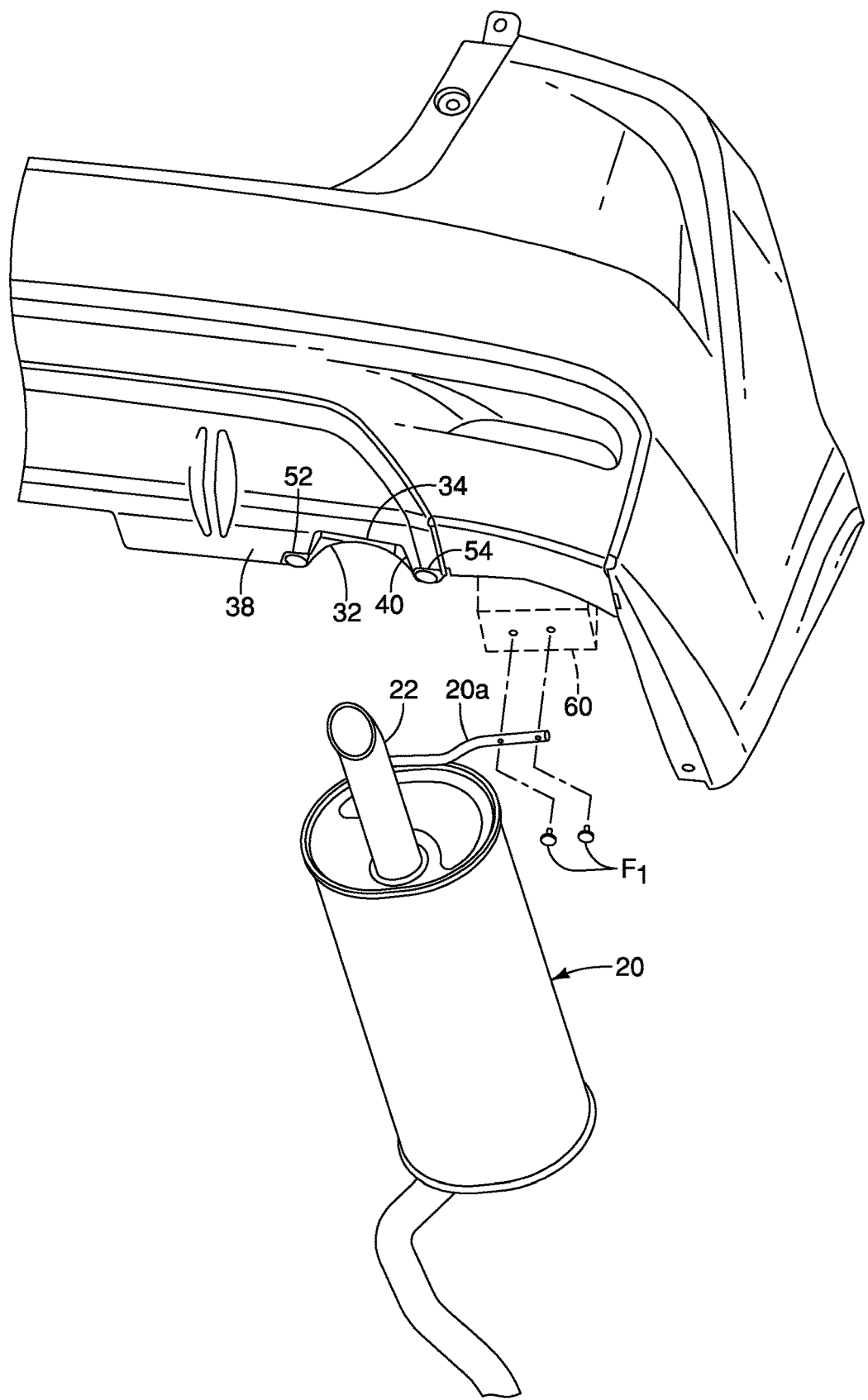
FIG. 13 is an exploded perspective view of the rear bumper fascia showing the finisher extension in the finishing orientation and a portion of the exhaust system during assembly thereof in accordance with the first embodiment.
Figure 14:
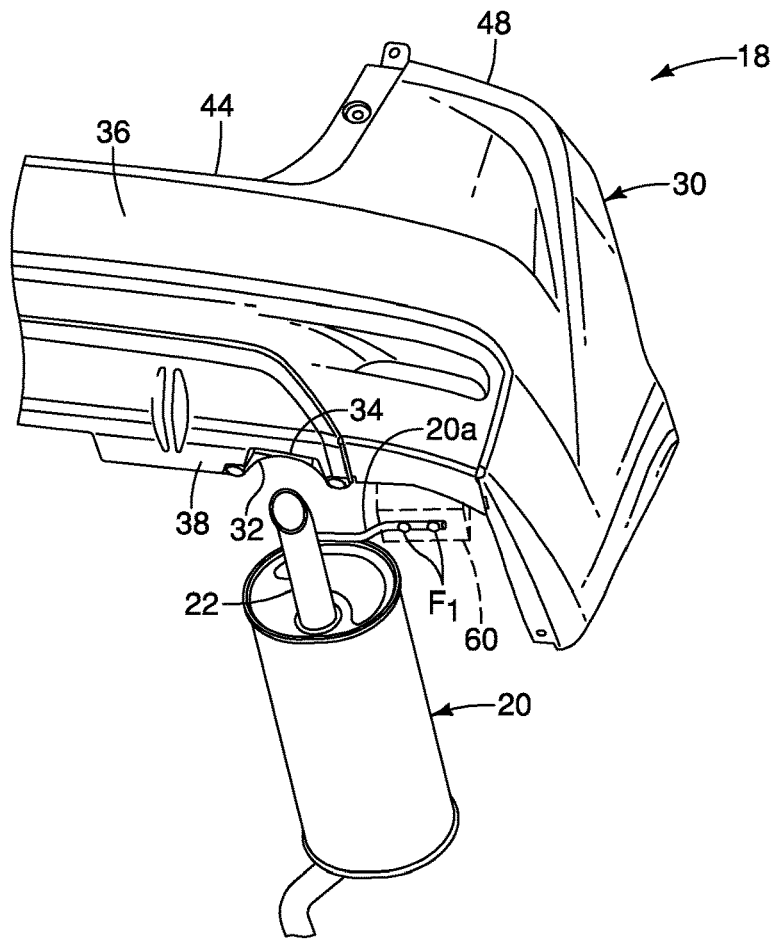
FIG. 14 is a perspective view of the rear bumper fascia similar to FIG. 13 showing the finisher extension in the finishing orientation and the portion of the exhaust system installed to a portion of a vehicle body structure of the vehicle in accordance with the first embodiment.
Figure 15:
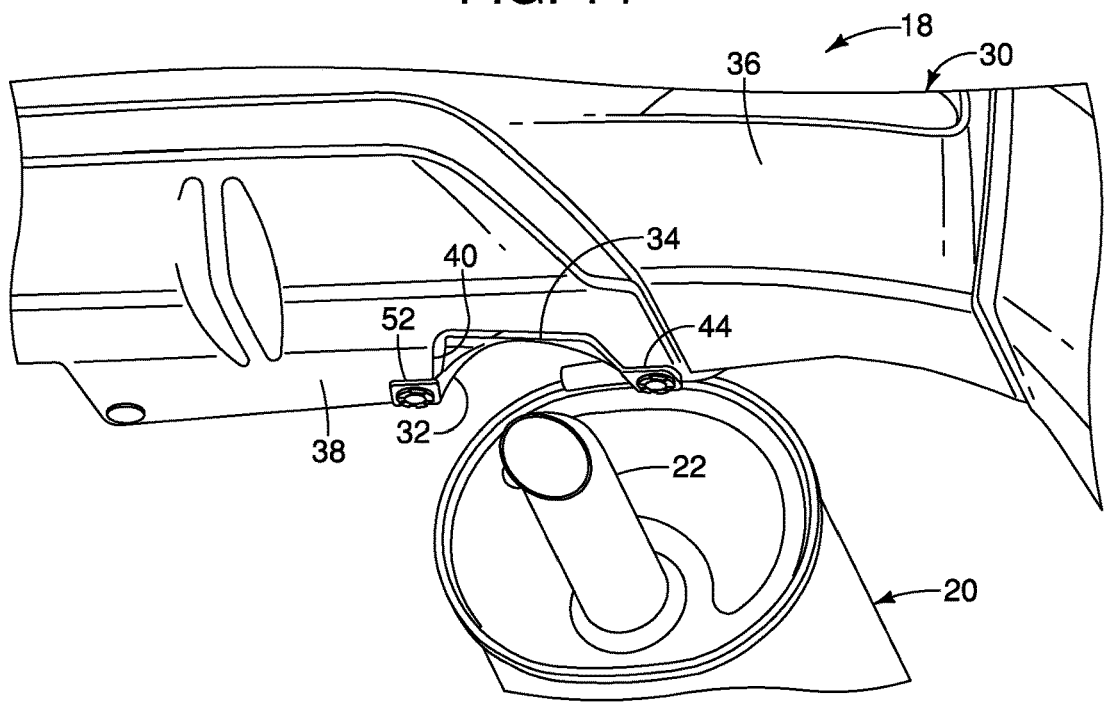
FIG. 15 is a perspective view of a portion of the rear bumper fascia depicted in FIG. 14 showing the finisher extension in the finishing orientation and the portion of the exhaust system installed to a portion of a vehicle body structure of the vehicle with the exhaust pipe extending rearward beneath the finisher extension in accordance with the first embodiment.
Figure 16:
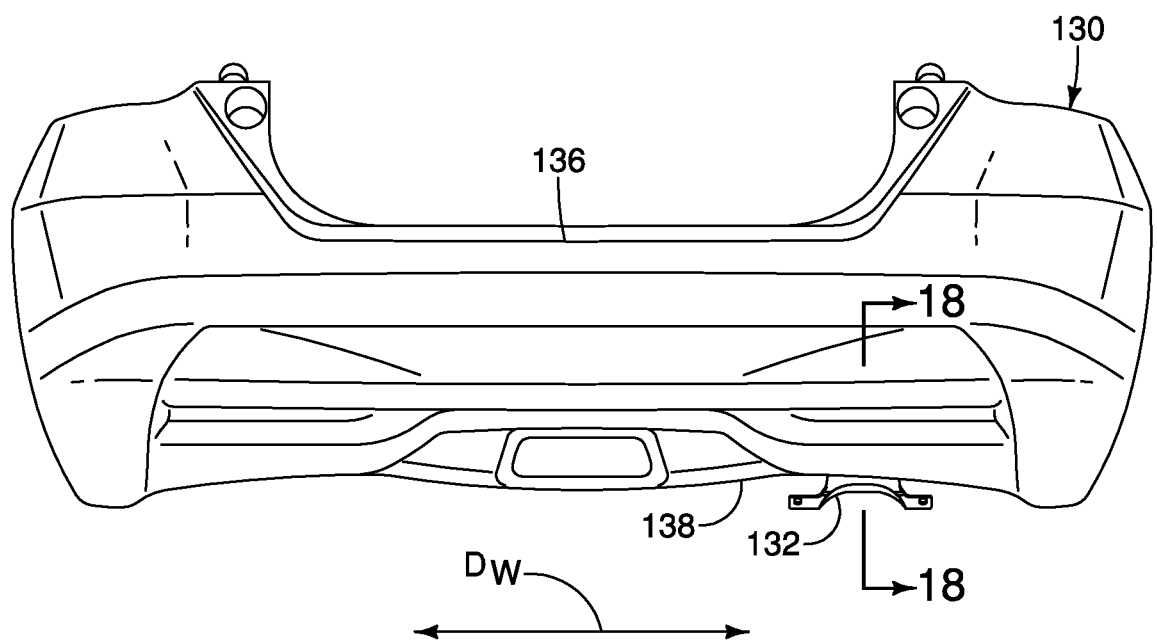
FIG. 16 is a rear view of a rear bumper fascia with a finisher extension in an extending orientation in accordance with a second embodiment.

Thereafter as shown in FIG. 13-15, the exhaust system 20 is installed to the vehicle 10 with a bracket 20*a* being attached to a part or frame member 60 of the vehicle body structure 12. The exhaust system 20 is shaped and dimensioned such that when installed to the vehicle 10, the exhaust pipe 22 is located adjacent to the conically shaped portion 56 of the finisher extension 32. More specifically, the exhaust pipe 22 extends below the rear bumper fascia 18 in an area adjacent to and spaced apart from the recessed area 40 and the finisher projection 32 with the finisher projection 32 in the finishing orientation.

The appearance of the rear of the vehicle 10 is enhanced by the inclusion of the finisher extension 32, which is partially visible from the rear of the vehicle, as shown in FIGS. 1 and 13-15.

Second Embodiment

Referring now to FIGS. 16-19, a main body 130 of a rear bumper fascia in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 17:
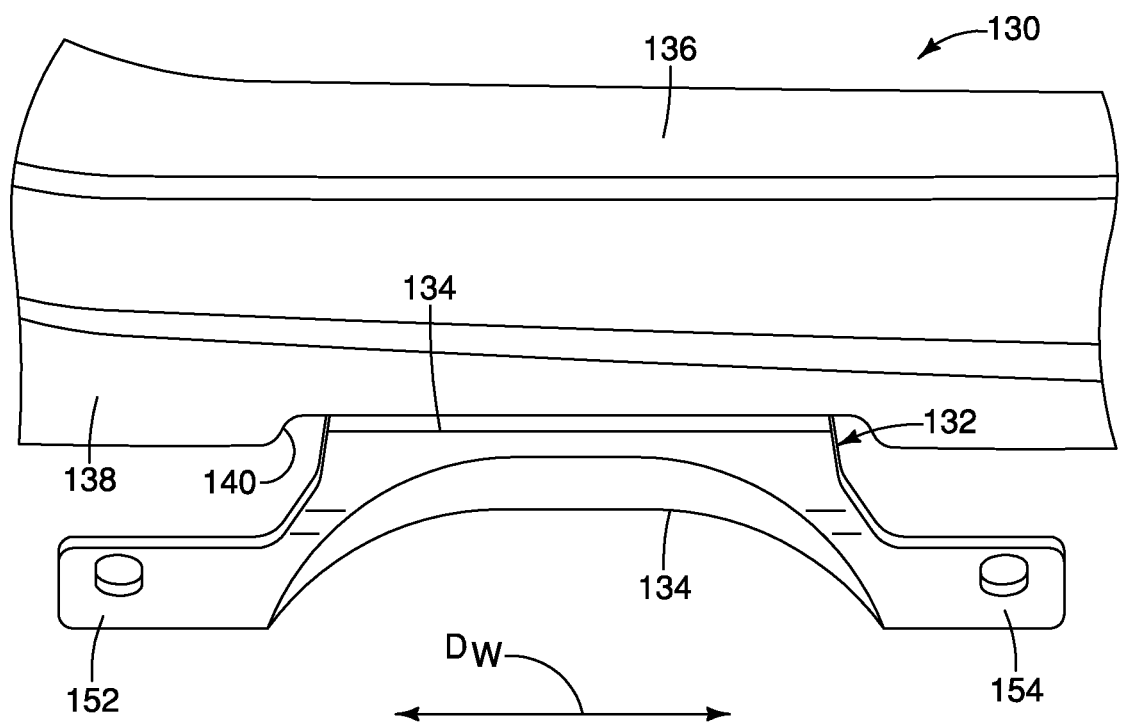
FIG. 17 is a rear view of a portion of the rear bumper fascia depicted in FIG. 16 showing the finisher extension and a living hinge extending adjacent to a recessed area in accordance with the second embodiment.
Figure 18:
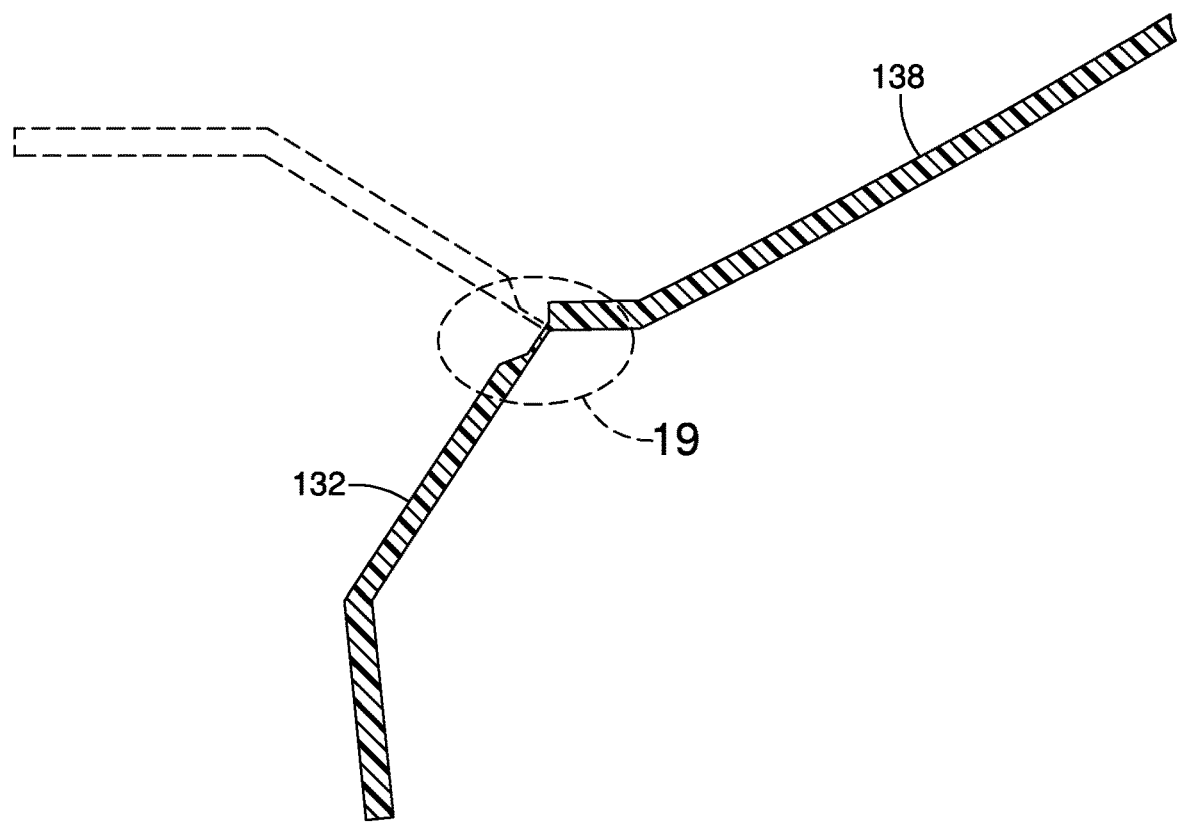
FIG. 18 is a cross-section of the rear bumper fascia taken along the line 18-18 in FIG. 16 showing the main body, the lower flange section, the living hinge and the finisher extension with the finisher extension in the extending orientation in accordance with the second embodiment.
Figure 19:
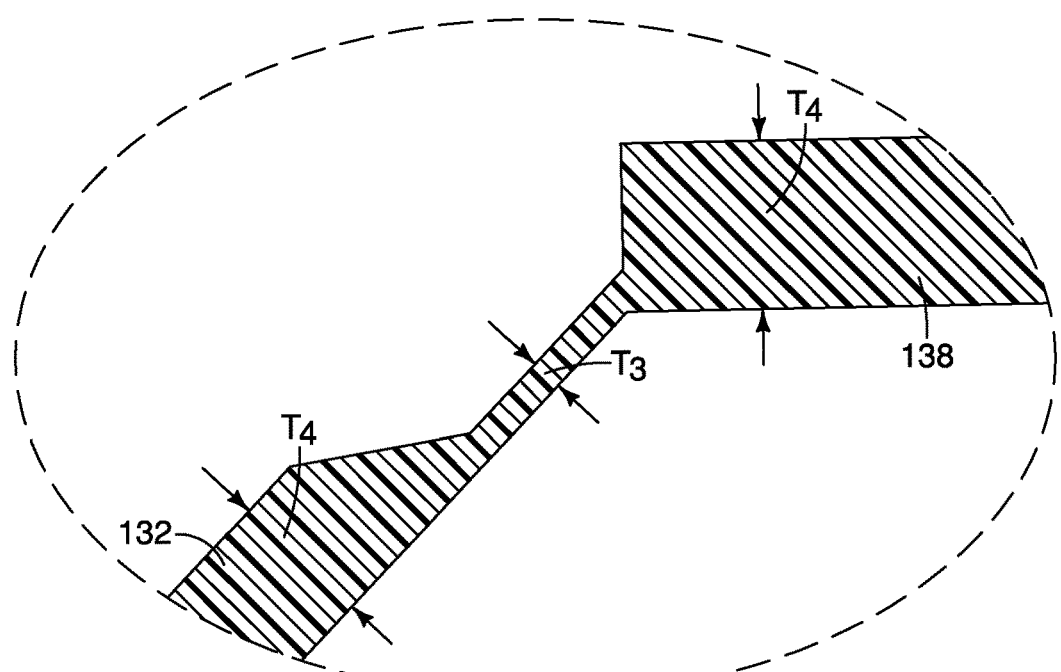
FIG. 19 is another cross-section of a portion the rear bumper fascia depicted in FIG. 18, showing the relative thicknesses of the lower flange section, the living hinge and the finisher extension with the finisher extension in the extending orientation in accordance with the second embodiment.
Figure 20:
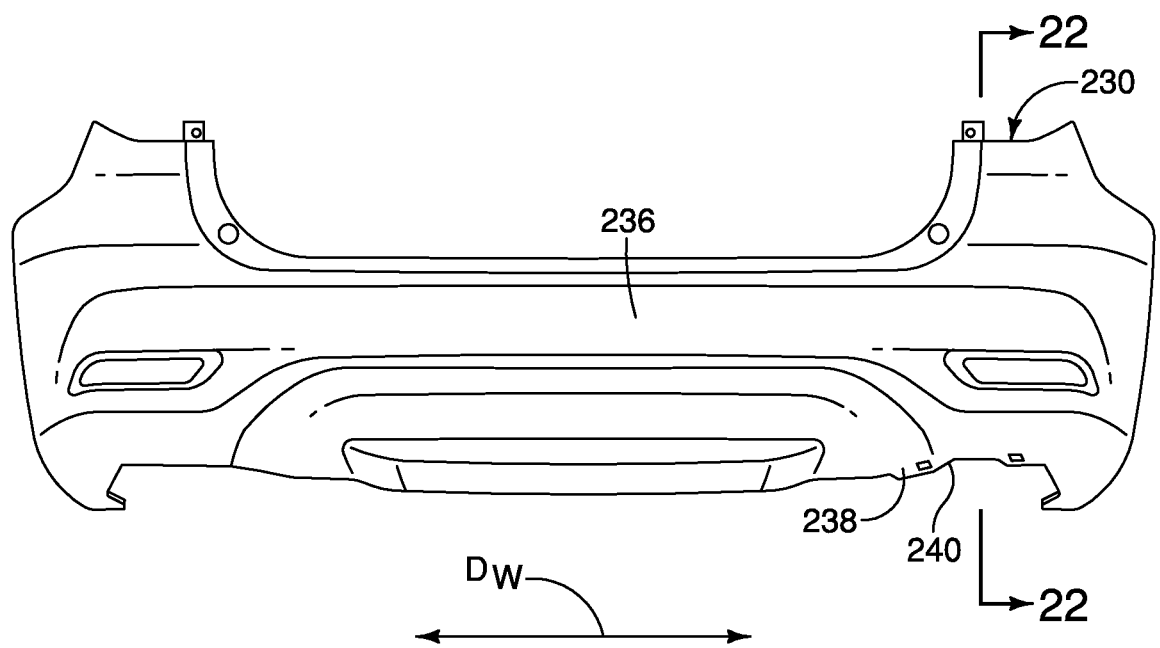
FIG. 20 is a rear view of a rear bumper fascia with a finisher extension in an extending orientation in accordance with a third embodiment.

In the second embodiment the main body 130 includes a rearward facing surface 136, a lower flange section 138 and a finisher extension 132. The lower flange section 138 includes a recessed area 140, as shown in FIG. 17. The finisher extension 132 is connected to the main body 130 via a living hinge 134. As shown in FIGS. 18 and 19, the living hinge 134 has a thickness $T_3$, while the lower flange section 138 and the finisher extension 132 have a thickness $T_4$. The thickness $T_4$ is several times larger than the thickness $T_3$.

As shown in FIG. 17, the living hinge 134 is approximately parallel to the widthwise direction $D_W$ of the main body 30 (and the vehicle 10). Further, attachment flanges 152 and 154 of the finisher extension 132 are linearly aligned with one another relative to the widthwise direction $D_W$ of the main body 130 (and the vehicle 10).

Third Embodiment

Referring now to FIGS. 20-23, a main body 230 of a rear bumper fascia in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Figure 21:
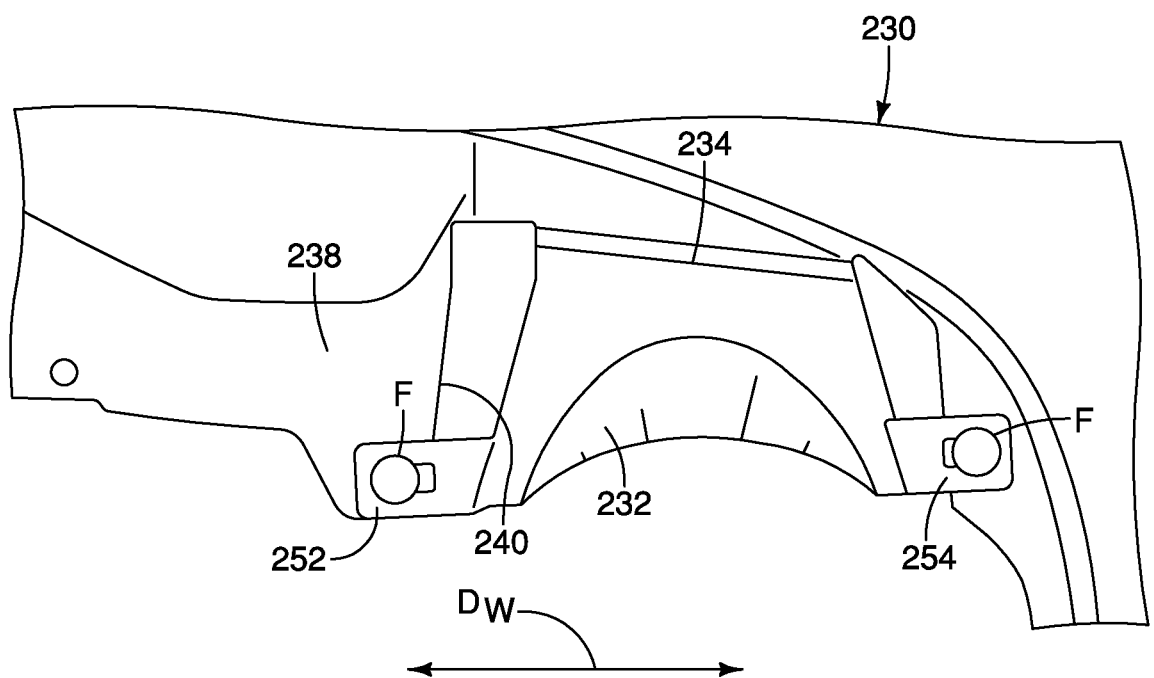
FIG. 21 is a rear view of a portion of the rear bumper fascia depicted in FIG. 20 showing the finisher extension and a living hinge extending adjacent to a recessed area in accordance with the third embodiment.
Figure 22:
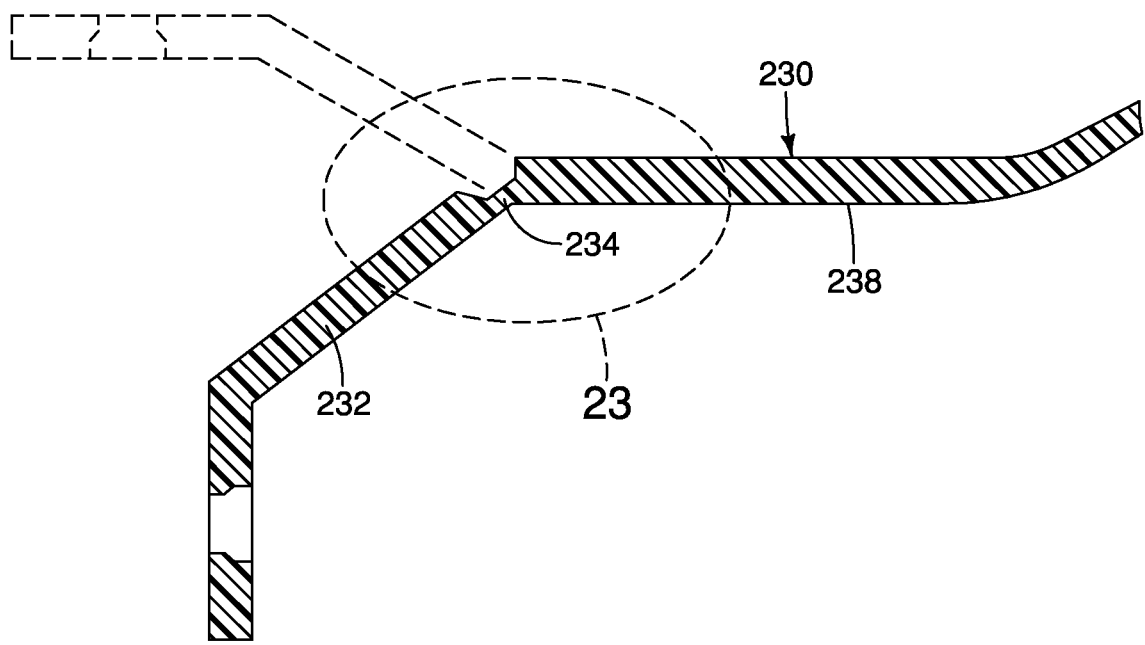
FIG. 22 is a cross-section of the rear bumper fascia taken along the line 22-22 in FIG. 20 showing the main body, the lower flange section, the living hinge and the finisher extension with the finisher extension in the extending orientation in accordance with the third embodiment.
Figure 23:
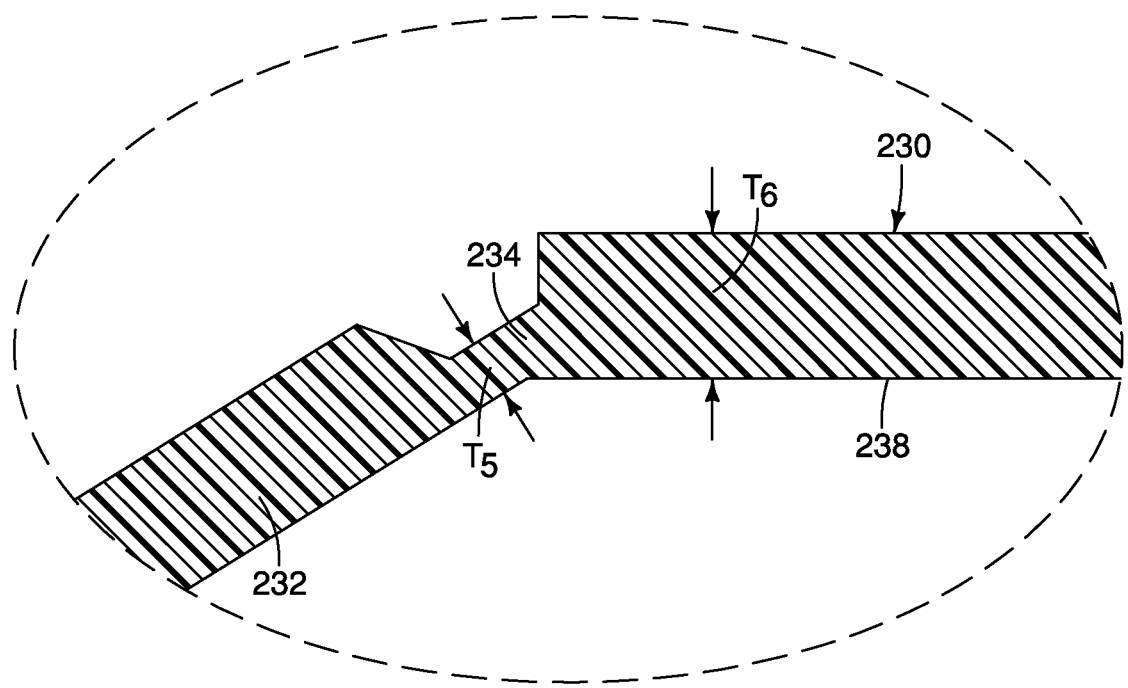
FIG. 23 is another cross-section of a portion the rear bumper fascia depicted in FIG. 20, showing the relative thicknesses of the lower flange section, the living hinge and the finisher extension with the finisher extension in the extending orientation in accordance with the third embodiment.

In the third embodiment the main body 230 includes a rearward facing surface 236, a lower flange section 238 and a finisher extension 232. The lower flange section 238 includes a recessed area 240, as shown in FIG. 21. The finisher extension 232 is connected to the main body 230 via a living hinge 234. As shown in FIGS. 22 and 23, the living hinge 234 has a thickness $T_5$, while the lower flange section 238 and the finisher extension 232 have a thickness $T_6$. The thickness $T_6$ is more than twice the size of the thickness $T_5$, but less than three times the thickness $T_5$.

As shown in FIG. 21, the living hinge 234 is angularly offset from the widthwise direction $D_W$ of the main body 30 (and the vehicle 10). Further, attachment flanges 252 and 254 of the finisher extension 232 are linearly aligned with one another.

Fourth Embodiment

Figure 24:
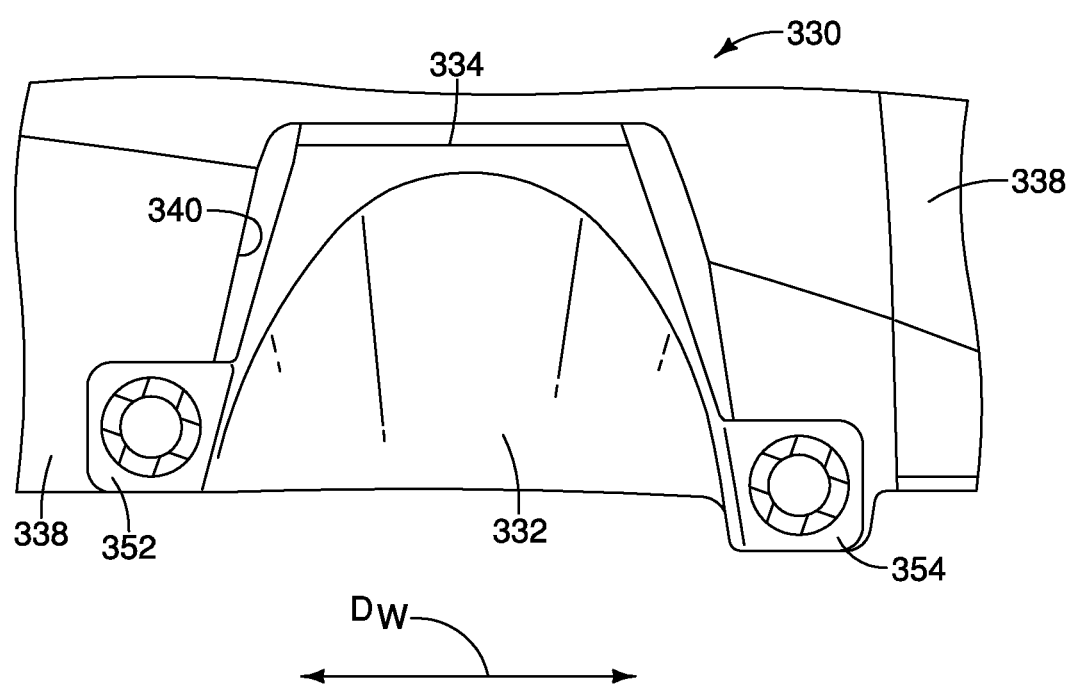
FIG. 24 is a rear view of a portion of the rear bumper fascia showing a finisher extension and a living hinge extending adjacent to a recessed area in accordance with the fourth embodiment.

Referring now to FIG. 24, a main body 330 of a rear bumper fascia in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment the main body 330 includes a rearward facing surface 336, a lower flange section 338 and a finisher extension 332. The lower flange section 338 includes a recessed area 340. The finisher extension 332 is connected to the main body 330 via a living hinge 334. The living hinge 334 is parallel to the widthwise direction $D_W$ of the main body 30 (and the vehicle 10). Further, attachment flanges 352 and 354 of the finisher extension 332 are offset from one another relative to the widthwise direction $D_W$ of the main body 330 (and the vehicle 10).

The vehicle body structure and other elements of the vehicle 10 other than the finisher extensions 32, 132, 232 and 332 (and associated features) are conventional components that are well known in the art. Since such structural features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the rear bumper assembly. Accordingly, these terms, as utilized to describe the present invention should be interpreted relative to a vehicle equipped with the rear bumper assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle rear bumper assembly, comprising:
   a vehicle body structure;
   an exhaust system attached to the vehicle body structure and having an exhaust pipe; and
   a rear bumper fascia having a main body and a finisher extension, the main body being attached to the vehicle body structure and having a recessed area shaped and dimensioned to complement the shape of the exhaust pipe, the finisher extension extending away from the main body proximate the recessed area, the main body and the finisher extension being formed with a living hinge therebetween such that the finisher extension is pivotable about the living hinge from an extending orientation with a distal end being spaced apart from the recessed area to a finishing orientation with the distal end of the finisher extension and the finisher extension being within at least a portion of the recessed area and being positioned adjacent to the exhaust pipe.

2. The vehicle rear bumper assembly in according to claim 1, wherein
   the main body, the living hinge and the finisher extension are formed as a single, unitary, monolithic element.

3. The vehicle rear bumper assembly in according to claim 1, wherein
the main body of the rear bumper fascia defines a rearward facing surface with the finisher extension extending downward from the rearward facing surface in the extending orientation.

4. The vehicle rear bumper assembly in according to claim 3, wherein
the main body includes a lower flange section that extends in a vehicle forward direction from a lower area of the rearward facing surface.

5. The vehicle rear bumper assembly in according to claim 4, wherein
the recessed area is at least partially defined in the lower flange section.

6. The vehicle rear bumper assembly in according to claim 5, wherein
the finisher extension extends approximately perpendicular to the lower flange section with the finisher extension in the extending orientation.

7. The vehicle rear bumper assembly in according to claim 5, wherein
the finisher extension extends approximately parallel to the lower flange section within the recessed area in the finishing orientation.

8. The vehicle rear bumper assembly in according to claim 7, wherein
a distal end of the finisher projection includes an attachment flange that attaches to the lower flange section with the finisher projection in the finishing orientation.

9. The vehicle rear bumper assembly in according to claim 1, wherein
the living hinge extends in a direction that is approximately parallel to a lateral widthwise direction of the rear bumper fascia.

10. The vehicle rear bumper assembly in according to claim 1, wherein
the living hinge extends in a direction that is not parallel to a lateral widthwise direction of the rear bumper fascia.

11. The vehicle rear bumper assembly in according to claim 1, wherein
the finisher extension includes a truncated conically shaped portion.

12. The vehicle rear bumper assembly in according to claim 11, wherein
the truncated conically shaped portion has a first end located at the living hinge and a second end that includes an attachment flange spaced apart from the living hinge.

13. The vehicle rear bumper assembly in according to claim 12, wherein
the attachment flange includes opposing attachment flange portions that are aligned with one another relative to a widthwise direction of the rear bumper fascia.

14. The vehicle rear bumper assembly in according to claim 12, wherein
the attachment flange includes opposing attachment flange portions that are not aligned with one another relative to a widthwise direction of the rear bumper fascia.

15. The vehicle rear bumper assembly in according to claim 12, wherein
the first end of the truncated conically shaped portion is narrower than the second end of the truncated conically shaped portion.

16. The vehicle rear bumper assembly in according to claim 1, wherein
the living hinge and the finisher extension are located proximate a lateral side of the rear bumper fascia.

17. The vehicle rear bumper assembly in according to claim 1, wherein
the recessed area is located along a lower area of the rear bumper fascia.

18. The vehicle rear bumper assembly in according to claim 1, wherein
the recessed area is laterally spaced apart from a central area of a lower area of the rear bumper fascia.

19. The vehicle rear bumper assembly in according to claim 1, wherein
the exhaust pipe extends below the rear bumper fascia in an area adjacent to and spaced apart from the recessed area and the finisher projection with the finisher projection in the finishing orientation.

* * * * *